US005968418A

United States Patent [19]

Matsushita et al.

[11] Patent Number: 5,968,418

[45] Date of Patent: Oct. 19, 1999

[54] CONDUCTIVE CONTACT MATERIAL

[75] Inventors: Kouji Matsushita; Ikuro Chimoto, both of Toyokawa; Munenori Nakano, Aichi-Ken; Takeshi Suzuki, Toyokawa; Koichiro Higashiguchi, Chiryu, all of Japan

[73] Assignees: Kabushiki Kaisha Inoac Corporation, Aichi; Minolta Co., Ltd., Osaka, both of Japan

[21] Appl. No.: 09/113,369

[22] Filed: Jul. 10, 1998

[30] Foreign Application Priority Data

Jul. 11, 1997 [JP] Japan .................................... 9-186320

[51] Int. Cl.$^{6}$ .............................. H01B 1/20; C03G 15/16

[52] U.S. Cl. ............................................ 252/500; 399/313

[58] Field of Search .................................... 252/500, 511, 252/510, 518.1, 519.33; 560/157; 524/379, 474, 323, 525; 399/313

[56] References Cited

FOREIGN PATENT DOCUMENTS 57158259 3/1991 Japan .
58-87572 5/1993 Japan .
5-333724 12/1993 Japan .

*Primary Examiner*—Yogendra Gupta
*Assistant Examiner*—Derrick G. Hamlin
*Attorney, Agent, or Firm*—McDermott, Will & Emery

[57] ABSTRACT

The purpose of the present invention is to provide a conductive contact material, the contents of which do not generate soil on a charged body not only during initial use but also after repeated use. A conductive contact material consists of thermoset urethane material containing an antioxidant within a range from 0.1 to 0.3% by weight, and an inorganic ion electrically conducting agent with in a range form 0.01 to 2.00% by weight. After ozone exposure or the like, molecule chain scission of the base material and antioxidant leads generation of active monomers and origomers. However, the conductive contact material containing the above specified proportion of an antioxidant and an inorganic ion electrically conducting agent prevents generation of active monomers and origomers which are soiling source for a charged body. The conductive contact material also prevents antioxidant itself from being a soiling source. The employment of conductive contact material on a contact type charging device such as a transfer roller avoids disadvantages such as image noise caused by soil on a charged body without involving a large image forming apparatus and complex manufacturing process.

14 Claims, 6 Drawing Sheets

CONDUCTIVE CONTACT MATERIAL

This application is based on application No. 9-186320 filed in Japan, the content of which is hereby incorporated by reference.

BACKGROUND OF THE INVENTION

1. Field of the Invention

This invention relates to a conductive contact material used for various devices such as an electrizer, deelectrizer, development device, and transfer device of an electrophotographic and electrostatic image forming apparatus, and more particularly relates to a conductive contact material consisting of component molecules which does not decompose and does not soil an image carrier, etc. not only in initial use but also in repeated use to maintain the quality of the formed image at high level.

2. Description of Related Art

In electrophotographic and electrostatic image forming apparatuses used for copying machines, FAX machines, and printing machines, a charger is used for an electrizer, deelectrizer, transfer device, etc. Heretofore, devices which utilize corona discharge phenomenon such as a corotoron charger have been used predominately as the charger. However, recently contact type chargers are used widely to reduce ozone generation. Because a contact type charger has a conductive contact material which is in contact with a charged body such as an image carrier, component of the contact material partially can adhere to the charged body and cause chemical change to soil the charged body. Particularly, when direct contact continues for a long time, for example, during resting, a charged body is apt to be soiled.

Such soil causes following problems. In the case that a charged body is an image carrier consisting of photosensitive material or dielectric material, photosensitivity or electrification property of a soiled portion deviates from a normal value to cause image noise. In addition, friction coefficient of a cleaner material deviates from the normal value at a soiled portion to cause irregular motion, and the irregular motion causes also image noise. In the case that the charged body is a transfer conveyer belt or intermediate transfer body, deviation of resistance value, electrification property, and friction coefficient of a soiled portion from a normal value causes image noise.

In particular, when an image forming apparatus is used repeatedly for a long time, soiling due to component of the conductive contact material becomes remarkable. The soiling is attributed to ozone and $NO_x$ which attack the conductive contact material around the portion where oxygen and $NO_x$ are generated. Since a little ozone and $NO_x$ are generated because of charging by applying discharge even though a contact charging device is used. Molecular chains of resin material which is a base material of the conductive contact material are fragmented to generate active monomers and origomers, which can be a soiling source. In particular, use of an organic ion conducting agent having a large molecular weight added to provide electric conductivity facilitates scission of molecular chain of the ion conducting agent due to ozone and $NO_x$ to generate origomers, and results in increased soiling of the charged body. Further, an organic ion type conducting agent is not preferable because it functions as a plasticizer itself due to its large molecular weight to cause bleeding, from this view point of soiling source an organic ion type conducting agent is not preferable.

Various measures has been taken to avoid soiling. For example, Japanese Unexamined Patent Publication No. Hei 5-333724 discloses an image forming apparatus in which a transfer roller is rotated with linking to a photosensitive drum namely charged body, and when the photosensitive drum is brought to a stop the transfer roller is separated from the photosensitive drum. In the image forming apparatus of this patent, conductive contact material of the transfer roller is prevented from being in contact with the photosensitive drum for a long time in order to suppress soiling of the photosensitive drum due to component of the conductive contact material. Japanese Unexamined Patent Publication No. Sho 58-87572 discloses an image forming apparatus provided with a transfer roller having the surface which is coated with epichlorohydrin rubber. The image forming apparatus helps prevent a charged body from being soiled due to conductivity of a transfer roller and component of a contact member.

However, the conventional image forming apparatuses disclosed in the above-mentioned publications can not solve the problem described herein under because a conventional conductive contact material is used as it is. In detail, an image forming apparatus disclosed in Japanese Unexamined Patent Publication No. Hei 5-333724 is inevitably large sized and requires increased number of parts because the apparatus requires a mechanism for rendering a transfer roller movable from a photosensitive drum. On the other hand, an image forming apparatus disclosed in Japanese Unexamined Patent Publication No. Sho 58-87572 complex manufacturing process for forming a coating layer on a transfer roller results in increasing the percentage of defective product.

The present invention is accomplished to solve the above-mentioned problems of the conventional arts. In detail, the object of the present invention is to provide a conductive contact material which does not soil a charged body due to component thereof not only during initial use but also after repeated use, and to reduce disadvantages such as image noise due to soil on a charged body without involving a large image forming apparatus and complex manufacturing process.

To solve the above-mentioned problem, the conductive contact material of the present invention consists of base material of thermoset urethane containing an antioxidant and an inorganic ion electrically conducting agent. The antioxidant is preferably of a radical chain terminator type. The antioxidant content is preferably in a range from 0.1 to 3.0% by weight. The electrically conducting agent content is preferably in a range from 0.01 to 2.00% by weight.

The conductive contact material contains an inorganic ion electrically conducting agent in order to render the electrically conductive contact material electrically conductive. As the result, the conductive contact material is corrosion-resistant to ozone and $NO_x$ different from a conductive contact material containing an organic ion electrically conducting agent, therefore can not be a remote cause of monomers and origomers which are cause of soiling. An inorganic ion electrically conducting agent remains homogeneously in the base material differently from an electrically conducting agent of electron conducting type such as carbon and metal oxide, therefore electrical conductivity is even through the base material. Further, an antioxidant contained in the conductive contact material in an suitable amount prevents molecular chains of thermoset urethane namely the base material from being attacked by ozone and $NO_x$, and as the result, generation of monomers and origomers due to scission of molecular chains is prevented. In particular, because of radical type oxidation mechanism of ozone and $NO_x$, the radical chain terminator type antioxidant is very effective. Examples of radical chain terminator type antioxidant include hindered phenols and aromatic amines.

SUMMARY OF THE INVENTION

An embodiment of an image forming apparatus provided with a conductive contact material in accordance with the present invention as a transfer roller will be described in detail hereinafter with reference to the drawings. FIG. 1 shows a schematic structure of the image forming apparatus in accordance with the present invention.

As shown in FIG. 1, the image forming apparatus comprises various devices such as a photosensitive drum namely an image carrier 1 located at the center, a rotation charging brush 11, an exposure system 21, a development device 31, a transfer roller 41. The rotation charging brush 11 connected to a charging high voltage electric source 12 functions to charge the photosensitive surface layer of the photosensitive drum 1. The exposure system 21 scans a laser beam generated from a laser light source 22 through a lens system 23 and a reflector 24 for exposing to form an electrostatic latent image on a photosensitive layer. The development device 31 is provided with a development roller 32 and connected to a development bias electric source 33, and functions to feed negatively polarized toner on the electrostatic latent image on the photosensitive drum 1 for development. The transfer roller 41 connected to a transfer electric source 42 functions to transfer the toner image on the photosensitive drum 1 to a recording paper S. Guide members 61 and 62 and destaticizing needles 51 are provided on the front end and back end of the transfer roller.

The image forming apparatus having the above-mentioned schematic structure is operated as described herein under. The photosensitive surface layer of the photosensitive drum 1 is charged by the charging high voltage electric source 12 through the rotation charging brush 11 up to minus several hundred volt with anti-clock rotation in FIG. 1 of the photosensitive drum 1, then, a laser beam is irradiated from the exposure system 21 onto the charged photosensitive layer according to image data. Potential of portions where the laser beam is irradiated decreases to form an electrostatic latent image. When the electrostatic latent image reaches the development device 31, the electrostatic latent image is developed. In detail, toner is fed onto the electrostatic latent image from the development roller 32 of the development device 31 under controlling by the development bias electric source 33 to form a toner image. When the toner image reaches the transfer roller 41, the toner is transferred onto the recording paper S being conveyed along the guide member 61 by the transfer electric source 42 through the transfer roller 41. The recording paper S which received the toner image is separated from the photosensitive drum 1 by the destaticizing needles 51, and conveyed along the guide member 62.

In the image forming apparatus, the conductive contact material in accordance with the present invention is applied to the transfer roller 41. The transfer roller is described further in detail with reference to FIG. 2. FIG. 2 is a perspective view of the transfer roller 41, and as shown in FIG. 2, the transfer roller 41 has the structure that the cylindrical semiconductive member 43 is fixed to a shaft 44. The shaft 44 functions as a rotation center axis of the transfer roller and functions to electrically connect between the semiconductive member 43 and the transfer electric source 42. Therefore, any material may be used for the shaft 44 as long as the material has a required strength and electric conductivity. In detail, metal materials such as SUS (stainless steel) and conductive plastics may be used. The semiconductive member 43 is formed by molding a conductive contact material in accordance with the present invention in the form of a cylinder. In the image forming apparatus shown in FIG. 1, the transfer roller 41 is pressed on the photosensitive drum 1 by a spring with application of a voltage from the transfer electric source 42 to the shaft 44, and the transfer roller 41 allows the recording paper S to pass between the photosensitive drum 1 and the transfer roller 41.

Because the conductive contact material in accordance with the present invention is used as the material of the semiconductive member 43 of this transfer roller 41, molecular chains of thermoset urethane and electrically conducting agent which are components thereof is not fragmented not only during initial use but also in repeated use and does not generate active monomers and origomers. Hence, it is not required to provide a mechanism for separation of the transfer roller or to provide a coat layer for coating on the surface of the semiconductive member 43. A transfer sheet 45 made of conductive contact material in accordance with the present invention used as the material of this transfer sheet 45 as shown in FIG. 3 may be used instead of a transfer roller 41.

In the image forming apparatus shown in FIG. 1, conductive contact material in accordance with the present invention is used also for the coat layer of the brush portion of the rotation charging brush 11 and the development roller 32 in addition to the transfer roller. The rotation charging brush 11 may be replaced with a charging roller 13 shown in FIG. 4. The conductive contact material in accordance with the present invention may be used for a destaticizing sheet, cleaning blade, and cleaning roller.

The conductive contact material used for these parts consists of base material of thermoset urethane containing an antioxidant and an inorganic ion electrically conducting agent. A resin for structuring the thermoset urethane consists of the main component of polyhydroxyl compound and polyisocyanate compound containing various additives such as catalyst, foam stabilizer, and other additives.

As the polyhydroxyl compound, a polyol which is generally used for manufacturing soft polyurethane foams and polyurethane elastomers may be used. In detail, a generally used polyol such as a polyether-polyol having hydroxyl groups at the end or a polyester-polyol may be used. As a cross-linking agent or chain extender, ethylene glycol, diethylene glycol, propylene glycol, dipropylene glycol, 1,4-butane diol, glycerin, or trimethyl propane may be used.

Similarly, as the polyisocyanate compound, a polyisocyanate generally used for manufacturing soft polyurethane foams and polyurethane elastomers may be used. In detail, tolylenediisocyanate (within a range from TDI 65/35 to TDI 80/20), 4,4'-diphenylmethane diisocyanate (MDI), crude MDI, 1,6-hexamethylene diisocyanate (HDI), crude HDI, 2,2,4(2,4,4)-trimethylhexamethylene diisocyanate, 4,4'-dicyclohexylmethane diisocyanate (HMDI), or m-xylene diisocyanate (HDI) may be used. Alternatively, prepolymer which is obtained by reacting with polyols partially may be used.

As the catalyst, a generally used organic metal compound may be used. For example, dibutyl tin dilaurate, tin octylate, zinc octylate, and nickel acetylacetate are included in the example. As the foam stabilizer, a foam stabilizer generally used for foaming of polyurethane foams may be used. As the other additives, additives generally used for forming polyurethane foams such as pigments, organic fillers, and inorganic fillers may be used.

Antioxidants are classified into two groups of radical chain terminator type and peroxide decomposition type, the radical chain terminator type is more effective because oxidation mechanism due to ozone and $NO_x$ involves a radical type reaction. As the radical chain terminator type antioxidant, a hindered phenol or aromatic amine may be used. Examples of hindered phenols include triethyleneglycolbis [3-(3-t-butyl-5-methyl-4-hydroxyphenyl) propionate], isooctyl-3-(3,5-di-t-butyl-4-hydroxyphenyl) propionate, and 2,4-bis [(octylthio) methyl]-o-cresol. Examples of aromatic amines include octylated diphenylamine, phenyl-1-naphthylamine, and 4,4'-bis (αα-dimethylbenzyl) diphenylamine. Aromatic amines may be more effective as antioxidants when they are used with hindered phenols.

To disperse an antioxidant homogeneously in a polyol component of thermoset urethane, the antioxidant is preferably a liquid. From this view point, as the hindered phenol, isooctyl-3-(3,5-di-t-butyl-4-hydroxyphenyl) propionate, and 2,4-bis [(octylthio) methyl]-o-cresol are more preferable among the above-mentioned hindered phenols. Similarly, as the aromatic amines, octylated diphenylamine is more preferable among the above-mentioned aromatic amines. The antioxidant content is preferably in a range from 0.1 to 3.0% by weight, because the antioxidant content of lower than 0.1% by weight exhibits poor effect, and on the other hand, the antioxidant content higher than 3.0% by weight causes soiling of the photosensitive drum 1 due to bleeding. The reason why an excessive amount of an antioxidant causes bleeding is that an antioxidant itself is non-reactive with an isocyanate component of thermoset urethane and functions as a plasticizer.

Examples of inorganic ion electrically conducting agent include $LiCF_3SO_3$, $NaClO_4$, $LiClO_4$, $LiAsF_6$, $LiBF_4$, NaSCN, KSCN, NaCl, $Ca(ClO_4)$, and $NH_4ClO_4$. An only a small amount of inorganic ion electrically conducting agent can lower significantly the resistance value of a conductive contact material, therefore, a content of 0.01% by weight is sufficient for exhibiting significant effect. On the other hand, the content higher than 2.00% by weight does not further lower the resistance value because lowering of resistance value saturates. In addition, in this region, added ions react each other to form crosslinking, and crosslinking results in elevated glass transition point, therefore the resistance value is not lowered particularly in a low temperature environment. As a result, the resistance value of the conductive contact material depends on environmental factors such as season between summer and winter, and the time between day time and night time, such dependency causes the difference in performance of the transfer roller 41, and such difference is not preferable. Hence, the inorganic ion electrically conducting agent content is preferably in a range from 0.01 to 2.00% by weight.

The above-mentioned raw materials are mixed and dispersed, a reaction mixture is blended with bubbles of an inert gas mechanically to homogenize the mixture and the inert gas, and a stable foam is formed. The foam is heated to harden and the conductive contact material is obtained. For hardening, the foam is maintained at 120 to 180° C. for 20 to 60 minutes. For obtaining soft material which is used suitably for a transfer roller 41 and cleaning roller, water and a foaming agent are added to a mixture which is formed by mixing and dispersing raw materials, and then the mixture is discharged into a mold and heated to be hardened. In this process, proportions of respective raw materials may be prescribed so that a resistance value of $10^5$ to $10^9$ Ω which is preferable for a conductive contact material is obtained.

DESCRIPTION OF THE PREFERRED EMBODIMENTS

Figure 1:
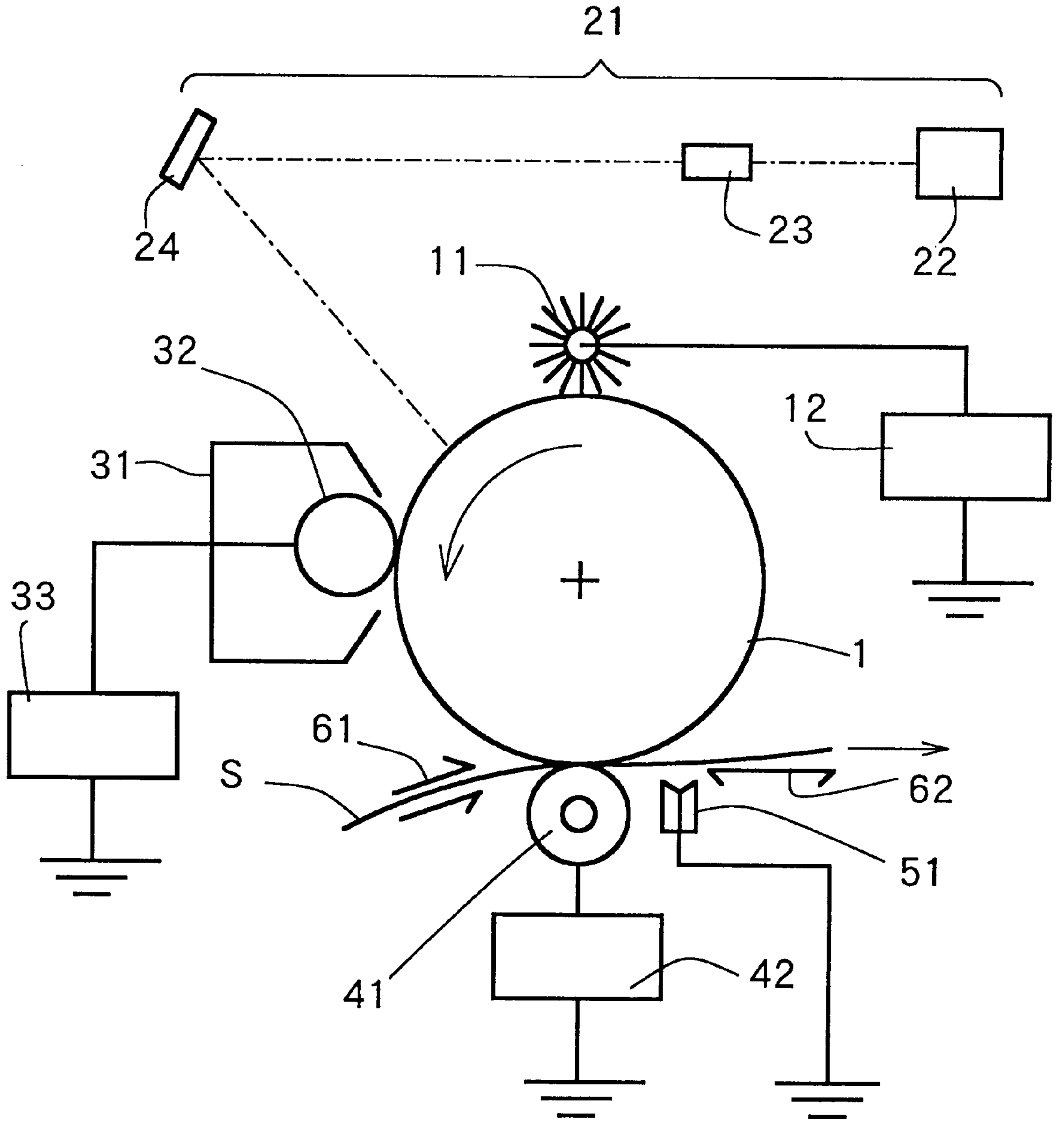
FIG. 1 is a schematic view showing the whole structure of an image forming apparatus.

Examples of conductive contact material of the present invention will be described in detail hereinafter with reference to comparative examples.

Example 1

(composition):

(1) Polyol component;

main component: EP551C (product of Mitsui Toatsu Chemicals, Inc.) 100 parts by weight chain extender: 1,4 -butanediol 3 parts by weight (2) electrically conducting agent (inorganic ion type);

anhydrous $LiClO_4$ (product of Kanto Kagaku Co.) 0.3 parts by weight (3) antioxidant (radical chain termination type);

IRGANOX1135 (hindered phenol) 0.4 parts by weight

IRGANOX5057 (aromatic amine) 0.1 parts by weight total 0.5 parts by weight (4) foam stabilizer: L-520 (product of Nippon Unika Co.); 2 parts by weight (5) catalyst;

33LV (product of Sankyo Air Product Co.) 0.15 parts by weight (6) isocyanate component;

MTL (product of Nippon Polyurethane Co.) 25 parts by weight

The above-mentioned IRGANOX1135 is isooctyl-3-(3,5-di-t-butyl-4-hydroxyphenyl) propionate, a product of Ciba Geigy Specialty Chemicals Inc. The above-mentioned IRGANOX5057 is octylated diphenylamine, a product of Ciba Geigy Specialty Chemicals Inc.

Figure 2:
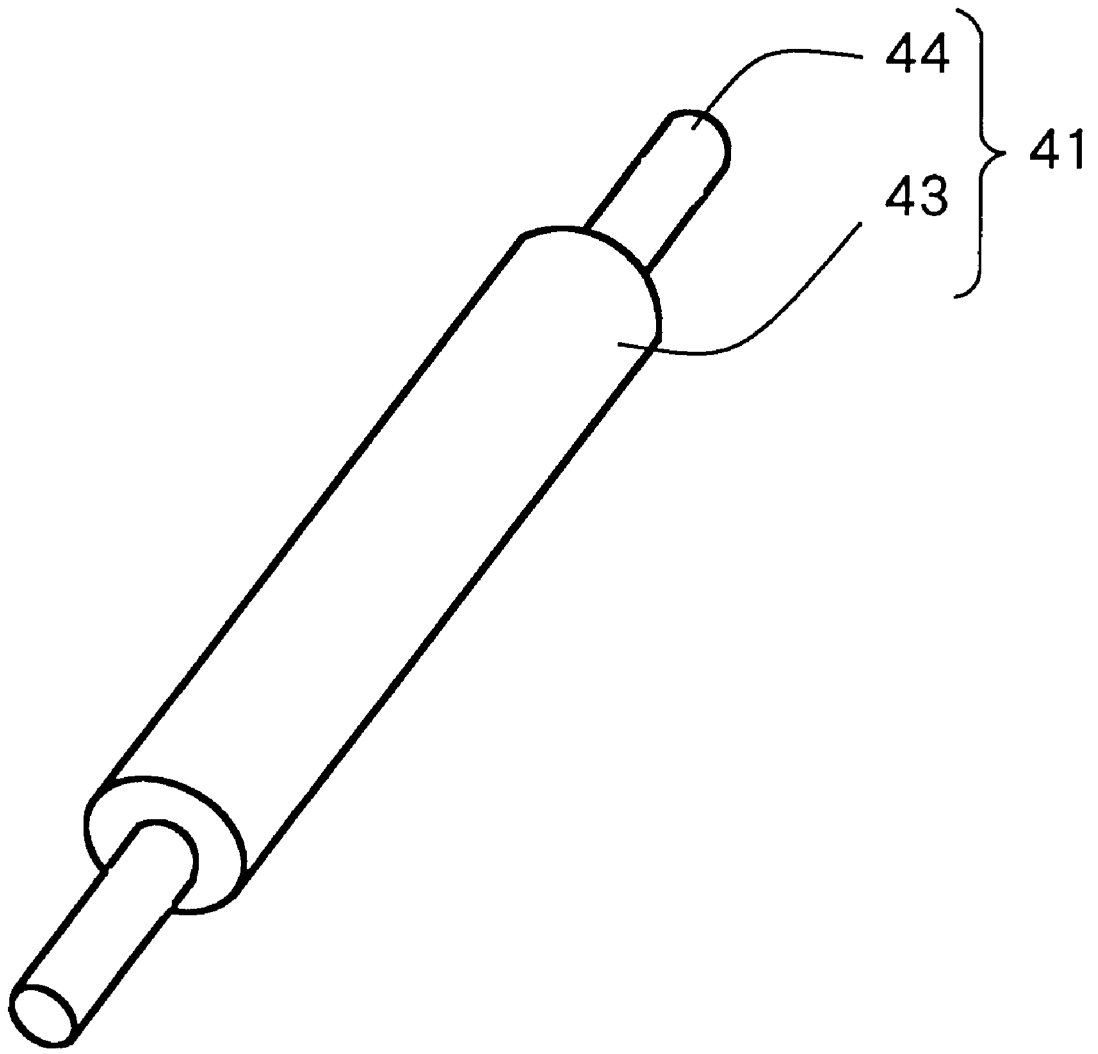
FIG. 2 shows the structure of a transfer roller.
Figure 3:
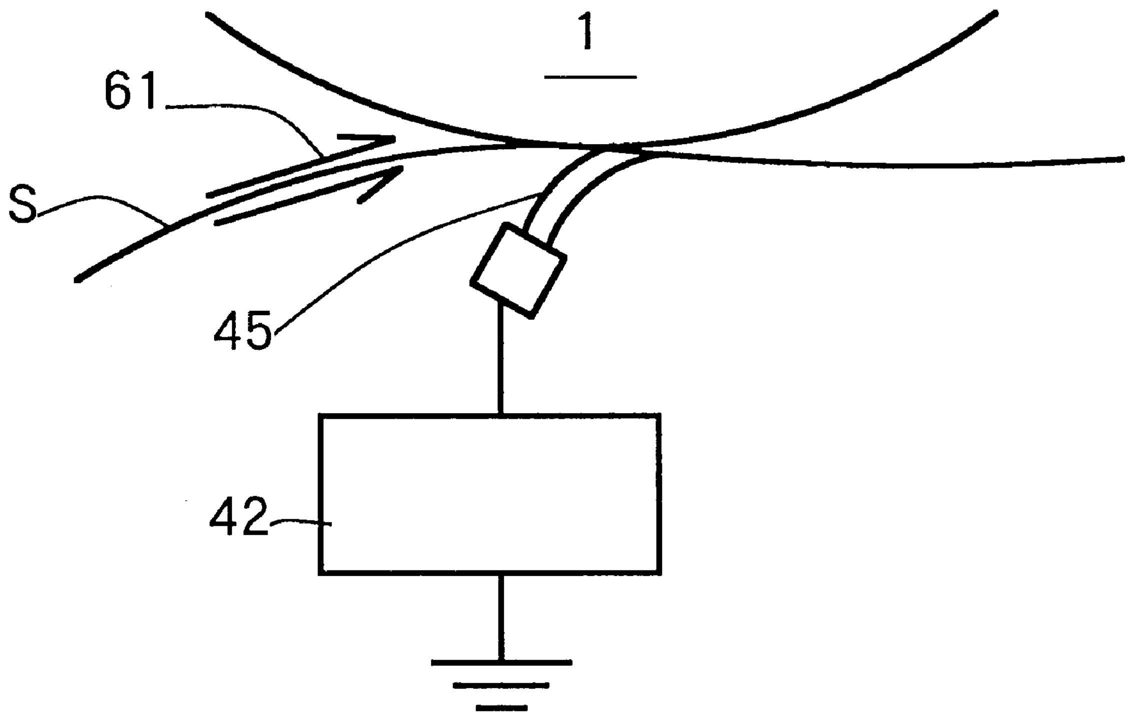
FIG. 3 shows the main part of an image forming apparatus which uses a transfer sheet.
Figure 4:
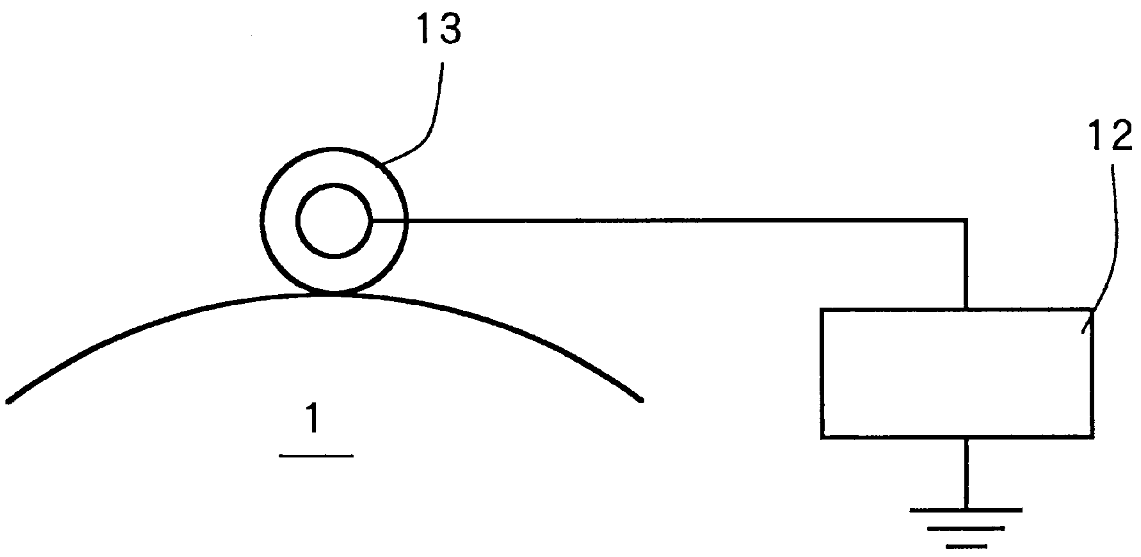
FIG. 4 shows the main part of an image forming apparatus which uses a charging roller.

The above-mentioned materials from (1) to (5) were mixed and stirred for 30 seconds in a plastic tank using a propeller mixer, then the above-mentioned (6) was added and stirred for 2 minutes in a foamer, and a foamed fluid in which fine cells were dispersed homogeneously was obtained. The foamed liquid was casted in a cylindrical mold having a diameter of 20 mm ϕ in which a shaft having a diameter of 6 mm ϕ is inserted, and maintained at 150° C. for 30 minutes to be hardened and molded to form a pipe shaped member. The pipe shaped member was polished using a cylindrical burnisher to obtain a pipe shaped member having a diameter of 16 mm ϕ, and cut to a length of 226 mm, and a semiconductive member 43 used as the transfer roller 41 shown in FIG. 2 was obtained. In this example, the semiconductive member 43 contains electrically conducting agent and antioxidant (total of hindered phenols and aromatic amines) in a standard content. The semiconductive member 43 was characterized variously.

First the test result of resistance is described. The resistance value is tested as described herein under. First the semiconductive member 43 was fixed to a shaft 44 to form a transfer roller 41 shown in FIG. 2. The transfer roller 41 is placed on an grounded metal plate, a load of 500 g was loaded at the both ends of the shaft 44 to press the transfer roller on the metal plate. In this condition, a voltage of 1 kV was applied between the metal plate and the shaft 44, and a flowing current $I_\tau[\mu A]$ was measured. $1/I_\tau$ was calculated, and this value is regarded as the resistance value $R_\tau[\times 10^9\ \Omega]$ of the semiconductive member 43. The measurement was carried out under three conditions of low temperature low humidity (10° C., 15% RH, referred to as LL hereinafter), normal temperature normal humidity (22° C., 55% RH, referred to as NN hereinafter), and high temperature high humidity (30° C., 85% RH, referred to as HH hereinafter), and the result listed herein under was obtained.

LL: $8.4\times10^7\ \Omega$

NN: $2.0\times10^7\ \Omega$

HH: $2.7\times10^6\ \Omega$

These values are all in a range from $10^5$ to $\mathbf{10}^9\ \Omega$ which is preferable for the resistance value of the conductive contact material. The environmental variation of resistance value LL/HH was calculated to be about 31. It is said that no problem is caused under normal in-room use condition if the environmental variation value is less than about 50. Therefore, it is found that the semiconductive member 43 of this example has an excellent resistance performance.

Next, the test result of resistance value variation after repeated use is described. In this test, the semiconductive member 43 was subjected to ozone/$NO_x$ exposure (referred to as ozone exposure hereinafter), the exposed samples were tested in the same manner as described herein above, and the value was compared with the value before exposure to calculate the variation. In ozone exposure, a corotoron charger and the semiconductive member 43 were placed in a sealed box which was maintained at 25° C. and 70% RH, the corotoron charger was operated in minus charging so that ozone concentration was maintained at 10 ppm with voltage control (actually not only ozone but also $NO_x$ is generated), the sample was subjected to ozone exposure under this condition for 100 hours. The resistance value after ozone exposure was measured under NN condition, and a value about 0.95 times the measured value of the fresh semiconductive member 43 under NN condition was obtained. It is said that the durability of a product is insufficient if the value is lower than 0.9. Therefore it is found that the semiconductive member 43 of this example is excellent in resistance value endurance stability.

Next, the test result of hardness endurance stability of the semiconductive member 43 is described. In this test, ascar C hardness of the semiconductive member 43 was measured before and after the ozone exposure using a 500 g constant loading device. As the result, a hardness value of 37 for the sample before exposure and hardness value of 37 for the sample after exposure were obtained. Because no significant difference in hardness was found between samples before and after exposure, it is found that the semiconductive member 43 of this example is excellent in hardness endurance stability.

Next, the test result of soiling of the photosensitive drum when the semiconductive member 43 is incorporated and used in an image forming apparatus is described. The test was carried out on samples before and after exposure in the manner as described herein under. First two laser beam printers SP-1700S, a product of Seiko Epson Co., were prepared as the image forming apparatus, transfer charger units of these apparatuses were modified so that transfer rollers of this example were set on. In these image forming apparatuses, the one end of the transfer roller was pressed by a 600 g spring and the other end was pressed by a 800 g spring, these springs forced a transfer roller onto a photosensitive drum. No. 1 apparatus was placed in a HH condition environment room and No. 2 apparatus was placed in a NN condition (normal environment) environment room. A test transfer roller was set on the No. 1 apparatus being pressed on a photosensitive drum and remained for 72 hours.

Afterward, an imaging cartridge containing the photosensitive drum was taken out from the No. 1 apparatus, and was conditioned in the NN condition room for 3 hours, and then set on the No. 2 apparatus for image forming. Four images of a 2 dots-on/2 dots-off halftone dot image, a black solid image, a white solid image, and a character image. A standard transfer roller was used instead of a test roller of this example for image forming, and the same roller was used every time in order to evaluate consistently. The noise level of obtained images were evaluated in five ranks described herein under, and soiling of the photosensitive drum by the transfer roller of this example was tested. Rank 5 means no soiling level, the smaller number means severer soiling, and rank 1 means practically unusable level.

Rank 5: no noise in all images.

Rank 4: no noise in a black solid image, white solid image, and character image, but slight noise in a halftone dot image.

Rank 3: no noise in a black solid image, white solid image, and character image, but some noise in a halftone dot image.

Rank 2: no noise in a black solid image, white solid image, and character image, but definite noise in a halftone dot image.

Rank 1: noise not only in a halftone dot image but also in a black solid image, white solid image, and character image. practically unusable.

The test result shows that a sample before exposure corresponds to rank 5, and a sample after exposure corresponds to rank 3. It is found from this result that a fresh transfer roller of this example does not soil a photosensitive body, and a repeatedly used transfer roller soils a photosensitive body not so severely as soiling of a photosensitive body causes a practical problem even though repeated use of the transfer roller.

Example 2

In this example, the content of the electrically conducting agent was reduced to the lower limit of the range from 0.01 to 2.00% by weight, other compositions are the same as those of Example 1. The electrically conducting agent content in this example is described herein under.

(2) electrically conducting agent (inorganic ion type):

anhydrous $LiClO_4$ (product of Kanto Kagaku Co.) 0.01 parts by weight

In this example, a semiconductive material 43 was formed in the same manner as used in Example 1, and the semiconductive material 43 was used for various characterization tests in the form of transfer roller sample.

Resistance $R_\tau$ of a fresh roller is described herein under.

LL: $3.6\times10^8\ \Omega$

NN: $9.1\times10^7\ \Omega$

HH: $1.2\times10^7\ \Omega$

These values are all in a range from $10^5$ to $10^9\ \Omega$ which is preferable as resistance value of a conductive contact material. The environmental variation LL/HH was calculated to be about 30, and this value is in a practically usable range. The variation of resistance after ozone exposure gives a value 0.95 times the value of a fresh roller under NN condition. Therefore, it is found that the semiconductive member 43 is excellent in resistance value and endurance stability.

Next, ascar C hardness was measured after exposure and before exposure, the value is described herein under.

Before exposure: 37

After exposure: 37

Because a significant difference was not found in hardness value between samples after exposure and before exposure, it is obvious that the semiconductive member 43 of this example is excellent in hardness endurance stability.

Next, soiling on a photosensitive drum was measured, and the result is described herein under.

Fresh sample: rank 5

Sample after exposure: rank 3

The result shows that a fresh transfer roller of this example does not soil a photosensitive body and a repeatedly used transfer roller soils not so seriously as a practically significant problem is caused.

Example 3

In this example, the content of the antioxidant was reduced to the lower limit of the range from 0.1 to 3.0% by weight, other compositions are the same as those of Example 1. The antioxidant content in this example is described herein under.

(3) antioxidant (radical chain termination type): IRGANOX1135 (hindered phenol) 0.08 parts by weight IRGANOX5057 (aromatic amine) 0.02 parts by weight
total 0.1 parts by weight In this example, a semiconductive material 43 was formed in the same manner as used in Example 1, and the semiconductive material 43 was used for various characterization tests in the form of transfer roller sample.

Resistance $R_\tau$ of a fresh roller is described herein under.

LL: $8.4\times10^7$ Ω

NN: $2.0\times10^7$ Ω

HH: $2.7\times10^6$ Ω

These values are all in a range from $10^5$ to $10^9$ Ω which is preferable as resistance value of a conductive contact material. The environmental variation LL/HH was calculated to be about 31, and this value is in a practically usable range. The variation of resistance after ozone exposure gives a value about 0.95 times the value of a fresh roller under NN condition. Therefore, it is found that the semiconductive member 43 is excellent in resistance value and endurance stability.

Next, ascar C hardness was measured and the result is listed herein under.

Before exposure: 37

After exposure: 37

Because a significant difference was not found in hardness value between samples after exposure and before exposure, it is obvious that the semiconductive member 43 of this example is excellent in hardness endurance stability.

Next, soiling on a photosensitive drum was measured, and the result is described herein under.

Before exposure: rank 5

After exposure: rank 2 to 3

The result shows that a fresh transfer roller of this example does not soil a photosensitive body and a repeatedly used transfer roller soils not so seriously as a practically significant problem is caused.

Example 4

In this example, the content of the antioxidant was increased to the upper limit of the range from 0.1 to 3.0% by weight, other compositions are the same as those of Example 1. The antioxidant content in this example is described herein under.

(3) antioxidant (radical chain termination type):

IRGANOX1135 (hindered phenol) 2.4 parts by weight

IRGANOX5057 (aromatic amine) 0.6 parts by weight
total 3.0 parts by weight

In this example, a semiconductive material 43 was formed in the same manner as used in Example 1, and the semiconductive material 43 was used for various characterization tests in the form of transfer roller sample.

Resistance $R_\tau$ of a fresh roller is described herein under.

LL: $8.0\times10^7$ Ω

NN: $1.9\times10^7$ Ω

HH: $2.6\times10^6$ Ω

These values are all in a range from $10^5$ to $10^9$ Ω which is preferable as resistance value of a conductive contact material. The environmental variation LL/HH was calculated to be about 31, and this value is in a practically usable range. The variation of resistance after ozone exposure gives a value about 0.95 times the value of a fresh roller under NN condition. Therefore, it is found that the semiconductive member 43 is excellent in resistance value and endurance stability.

Next, ascar C hardness was measured and the result is listed herein under.

Before exposure: 35

After exposure: 35

Because a significant difference was not found in hardness value between samples after exposure and before exposure, it is obvious that the semiconductive member 43 of this example is excellent in hardness endurance stability.

Next, soiling on a photosensitive drum was measured, and the result is described herein under.

Before exposure: rank 5

After exposure: rank 3

The result shows that a fresh transfer roller of this example does not soil a photosensitive body and a repeatedly used transfer roller soils not so seriously as a practically significant problem is caused.

Example 5

In this example, the content of the electrically conducting agent was increased to the upper limit of the range from 0.01 to 2.00% by weight, other compositions are the same as those of Example 1. The electrically conducting agent content in this example is described herein under.

(2) electrically conducting agent (inorganic ion type):

anhydrous $LiClO_4$ (product of Kanto Kagaku Co.) 2.00 parts by weight

In this example, a semiconductive material 43 was formed in the same manner as used in Example 1, and the semiconductive material 43 was used for various characterization tests in the form of transfer roller sample.

Resistance $R_\tau$ of a fresh roller is described herein under.

LL: $8.0\times10^6$ Ω

NN: $1.8\times10^6$ Ω

HH: $2.0\times10^5$ Ω

These values are all in a range from $10^5$ to $10^9$ Ω which is preferable as resistance value of a conductive contact material. The environmental variation LL/HH was calculated to be about 40, and this value is in a practically usable range. The variation of resistance after ozone exposure gives a value 0.93 times the value of a fresh roller under NN condition. Therefore, it is found that the semiconductive member 43 is excellent in resistance value and endurance stability.

Next, ascar C hardness was measured and the result is listed herein under.

Before exposure: 37

After exposure: 37

Because a significant difference was not found in hardness value between samples after exposure and before exposure, it is obvious that the semiconductive member 43 of this example is excellent in hardness endurance stability.

Next, soiling on a photosensitive drum was measured, and the result is described herein under.

Before exposure: rank 5

After exposure: rank 3

The result shows that a fresh transfer roller of this example does not soil a photosensitive body and a repeatedly used transfer roller soils not so seriously as a practically significant problem is caused.

Example 6

In this example, the content of the antioxidant was increased to a value exceeding the upper limit of the range from 0.1 to 3.0% by weight, other compositions are the same as those of Example 1. The antioxidant content in this example is described herein under.

(3) antioxidant (radical chain termination type):

IRGANOX1135 (hindered phenol) 4 parts by weight

IRGANOX5057 (aromatic amine) 1 parts by weight total 5 parts by weight

In this example, a semiconductive material 43 was formed in the same manner as used in Example 1, and the semiconductive material 43 was used for various characterization tests in the form of transfer roller sample.

Resistance $R_{96}$ of a fresh roller is described herein under.

LL: $7.3\times10^7$ Ω

NN: $1.8\times10^7$ Ω

HH: $2.2\times10^6$ Ω

The environmental variation LL/HH was calculated to be about 33. The variation of resistance after ozone exposure gives a value about 0.90 times the value of a fresh roller under NN condition. Therefore, it is found that the semiconductive member 43 is not problematic in resistance value and endurance stability.

Next, ascar C hardness was measured and the result is listed herein under.

Before exposure: 33

After exposure: 33

Because a significant difference was not found in hardness value between samples after exposure and before exposure, it is obvious that the semiconductive member 43 of this example is not problematic in hardness endurance stability.

Next, soiling on a photosensitive drum was measured, and the result is described herein under.

Before exposure: rank 3

After exposure: rank 2

The result shows that a fresh transfer roller of this example tend to soil a photosensitive drum a little but the degree of soil in this example is not practically problematic so long as a halftone dot image is not included. The reason of this fact is attributed to the cause that surplus portion of the antioxidant remains without chemical reaction and therefore the remains of antioxidant act as a plasticizer and soil a photosensitive drum. On the other hand, in Examples 1 to 5, because antioxidant content is suitable, soiling on a photosensitive drum is little.

Example 7

In this example, the electrically conducting agent content was increased to a value exceeding the upper limit of the range from 0.01 to 2.00% by weight, and other component compositions are the same as those described in Example 1. The composition of electrically conducting agent is listed herein under.

(2) electrically conducting agent (inorganic ion type):

anhydrous $LiClO_4$ (product of Kanto Kagaku Co.) 3.0 parts by weight

In this example, a semiconductive member was manufactured in the same manner as used in Example 1, and used for various characterization tests as a transfer roller sample.

The resistance value $R_\tau$ was measured and listed herein under.

LL: $6.9\times10^6$ Ω

NN: $1.3\times10^6$ Ω

HH: $1.2\times10^5$ Ω

The environmental variation LL/HH was measured to be about 57. The resistance value variation after ozone exposure was a value about 0.92 times the value of a fresh roller under NN condition. Though the resistance value of the semiconductive member 43 of this example exceeds the allowable range due to environmental change, the value itself and endurance stability are not problematic. The reason of this fact is attributed to the cause that cross-linking of excessively added electrically conducting agent results in a higher glass transition point and therefore the reduction of resistance value under LL condition does not correspond to the content. On the other hand, in Examples 1 to 5, because the electrically conducting agent content is suitable, the environmental variation of resistance value is small.

Next, ascar C hardness was measured and the result is listed herein under.

Before exposure: 36

After exposure: 36

Because a significant difference was not found in hardness value between samples after exposure and before exposure, it is obvious that the semiconductive member 43 of this example is not problematic in hardness endurance stability.

Next, soiling on a photosensitive drum was measured, and the result is described herein under.

Before exposure: rank 5

After exposure: rank 2

The result shows that a fresh transfer roller of this example does not soil a photosensitive drum seriously.

Comparative example 1

In this comparative example, the electrically conducting agent content was not included, and other component compositions were the same as those described in Example 1. That is to say, (2) electrically conducting agent (inorganic ion type):

anhydrous $LiClO_4$ (product of Kanto Kagaku Co.) none

In this comparative example, a semiconductive member was manufactured in the same manner as used in Example 1, and used for various characterization tests as a transfer roller sample.

The resistance value $R_\tau$ was measured and listed herein under.

LL: $1.6\times10^{10}$ Ω

NN: $4.1\times10^{9}$ Ω

HH: $5.5\times10^{8}$ Ω

These values were high and two of them exceeded a range from $10^5$ to $10^9$ Ω which is preferable as resistance value of a conductive contact material. The environmental variation LL/HH was calculated to be about 29. The resistance value variation after ozone exposure was a value about 0.96 times the value of a fresh roller under NN condition. The resistance value of a semiconductive contact material in this comparative example is too high at initial use. This is because the semiconductive contact material 43 did not contain electrically conducting agent. On the other hand, because suitable amount of inorganic ion electrically conducting agent is added to semiconductive contact material of each above-mentioned example, these semiconductive contact material are excellent in resistance value and endurance stability against environmental variation and repeated use.

Next, ascar C hardness was measured and the result is listed herein under.

Before exposure: 37

After exposure: 37

Because a significant difference was not found in hardness value between samples after exposure and before exposure, it is obvious that the semiconductive member of this comparative example is not problematic in hardness endurance stability.

Next, soiling on a photosensitive drum was measured, and the result is described herein under.

Before exposure rank 5

After exposure: rank 3

The result on the transfer roller of this comparative example shows that soiling on a photosensitive drum is not problematic.

Comparative example 2

In this comparative example, antioxidant content was not included, and other component compositions were the same as those described in Example 1. That is to say, (3) antioxidant (radical chain termination type):

IRGANOX1135 (hindered phenol) None

IRGANOX5057 (aromatic amine) None

In this comparative example, a semiconductive material was formed in the same manner as used in Example 1, and the semiconductive material was used for various characterization tests in the form of transfer roller sample.

The resistance value $R_\tau$ of a fresh transfer roller is listed herein under.

LL: $8.4\times10^{7}$ Ω

NN: $2.0\times10^{7}$ Ω

HH: $2.7\times10^{6}$ Ω

The environmental variation LL/HH was measured to be about 31. The resistance value variation after ozone exposure became significantly low and was measured to be a value about 0.85 times the value of a fresh transfer roller under NN condition. Therefore, setting aside initial use, resistance value of the semiconductive material in this comparative example is insufficient for repeated use as a product. The low resistance value is attributed to the cause that after exposure, molecular chains of polyol component and the like in the sample which does not contain antioxidant are fragmented, and then the molecule chain scission results in reduction of electrically conducting paths. On the other hand, because suitable amount of antioxidant is used in the above-mentioned examples, semiconductive material of the examples is excellent in resistance value and endurance stability.

Next, ascar C hardness was measured and the result is listed herein under.

Before exposure: 36

After exposure: 34

Hardness became low due to ozone exposure. It is obvious that that semiconductive member of this comparative example is problematic in hardness endurance stability. The low hardness is attributed to the cause that molecular chains of polyol component and the like in the sample which does not contain antioxidant are fragmented after ozone exposure and this makes material quality weak. On the other hand, because suitable amount of antioxidant is used in the above-mentioned examples, semiconductive material of the examples is excellent in hardness endurance stability.

Next, soiling on a photosensitive drum was measured, and the result is described herein under.

Before exposure: rank 5

After exposure: rank 1

Setting aside initial use, the transfer roller in this comparative example seriously soils photosensitive drum after repeated use and generates image noise which is practically problematic. The problematic soiling is attributed to the cause that molecular chains of polyol component of the sample without antioxidant are fragmented to generate active monomers and origomers after ozone exposure. The active monomers and origomers adhere to a photosensitive drum. On the other hand, because suitable amount of antioxidant is used in the above-mentioned examples, the transfer roller of the examples does not soil a photosensitive drum seriously even after repeated use.

Comparative example 3

In this comparative example, an organic ion electrically conducting agent was used instead of the inorganic ion electrically conducting agent, other component compositions were the same as those used in Example 1. The content of an electrically conducting agent in this comparative example is listed herein under.

(2) electrically conducting agent (organic ion type):

Eregan 264A 1.5 parts by weight

Eregan 264A, a product of Nippon Oils and Fats Co., Ltd., consists of modified aliphatic dimethylethyl ammonium ethosulfate. In this comparative example, a semiconductive member was formed in the same manner as used in Example 1, and variously characterized in the form of a transfer roller.

The resistance value $R_\tau$ of a fresh transfer roller is listed herein under.

LL: $1.1\times10^{8}$ Ω

NN: $2.0\times10^{7}$ Ω

HH: $1.8\times10^{6}$ Ω

The environmental variation LL/HH was measured to be about 59. The resistance value variation after ozone exposure was measured to be a value about 0.85 times the value of a fresh transfer roller under NN condition. Setting aside the value of the fresh transfer roller, the resistance value of the semiconductive member in this comparative example is insufficient in stability to environmental change and repeated use. The insufficient stability is attributed to the cause that the reduction of resistance value does not corresponds to the content due to low ion activity under LL condition and the electrically conducting agent itself is subjected to chain scission and fragmented due to ozone exposure because the electrically conducting agent is an organic ion electrically conducting agent. On the other hand in the above-mentioned examples, because the electrically conducting agent is an inorganic ion electrically conducting agent, the resistance value is stable to the environment and repeated use.

Next, ascar C hardness was measured and the result is listed herein under.

Before exposure: 36

After exposure: 35

Reduction of hardness due to exposure suggests the problematic endurance stability in hardness of the semiconductive member of this comparative example. The poor hardness endurance stability is attributed to the cause that material quality becomes weak due to ozone exposure damage of the organic ion electrically conducting agent. On the other hand, because the inorganic ion electrically conducting agent is used in the above-mentioned examples, the hardness is stable to repeated use.

Next, soiling of a photosensitive drum was measured and the result is listed herein under.

Before exposure: rank 5

After exposure: rank 2 to 3

The test result on the transfer roller of this comparative example suggests that soiling on a photosensitive drum is not problematic.

Comparative example 4

In this comparative example, the content of an organic ion electrically conducting agent was increased more than comparative example 3, other component compositions were the same as those used in Example 1. The content of an electrically conducting agent in this comparative example is listed herein under.

(2) electrically conducting agent (organic ion type):

Eregan 264A 3.5 parts by weight

In this comparative example, a semiconductive member was formed in the same manner as used in Example 1, and variously characterized in the form of a transfer roller.

The resistance value $R_\tau$ of a fresh transfer roller is listed herein under.

LL: $2.3\times10^7$ Ω

NN: $4.0\times10^6$ Ω

HH: $3.5\times10^5$ Ω

The environmental variation LL/HH was measured to be about 65, which is a significantly great variation value. The resistance value variation after ozone exposure was measured to be a value about 0.79 times the value of a fresh transfer roller under NN condition. The variation from the value of initial use to that of repeated use is noticeable. Setting aside the value of the fresh transfer roller, the resistance value of the semiconductive member in this comparative example is even more insufficient in stability to environment and repeated use than comparative example 3. The insufficient stability is attributed to the cause that greater content of organic ion electrically conducting agent is used in this comparative example.

Next, ascar C hardness was measured and the result is listed herein under.

Before exposure: 33

After exposure: 30

Reduction of hardness due to exposure suggests the problematic endurance stability in hardness of the semiconductive member of this comparative example. The poor hardness endurance stability is attributed to the cause that greater content of organic ion electrically conducting agent is used in this comparative example than in Comparative example 3.

Next, soiling of a photosensitive drum was measured and the result is listed herein under.

Before exposure: rank 4

After exposure: rank 1

The test result on the transfer roller of this comparative example suggests that the transfer roller has no problem in practical use instantly except a case of halftone dots images to be transferred. However, the result also suggests that transfer roller tends to soil a photosensitive drum a little even at initial use and after repeated use, the roller soils the drum seriously and the soiling generates image noise which is practically problematic. The image noise is attributed to the cause that greater content of organic ion electrically conducting agent is used in this comparative example than in Comparative example 3 and therefore, an organic ion acts as a plasticizer and soils a photosensitive drum. This tendency becomes noticeable especially after ozone exposure which causes organic ion molecule chains to be fragmented.

Figure 5:
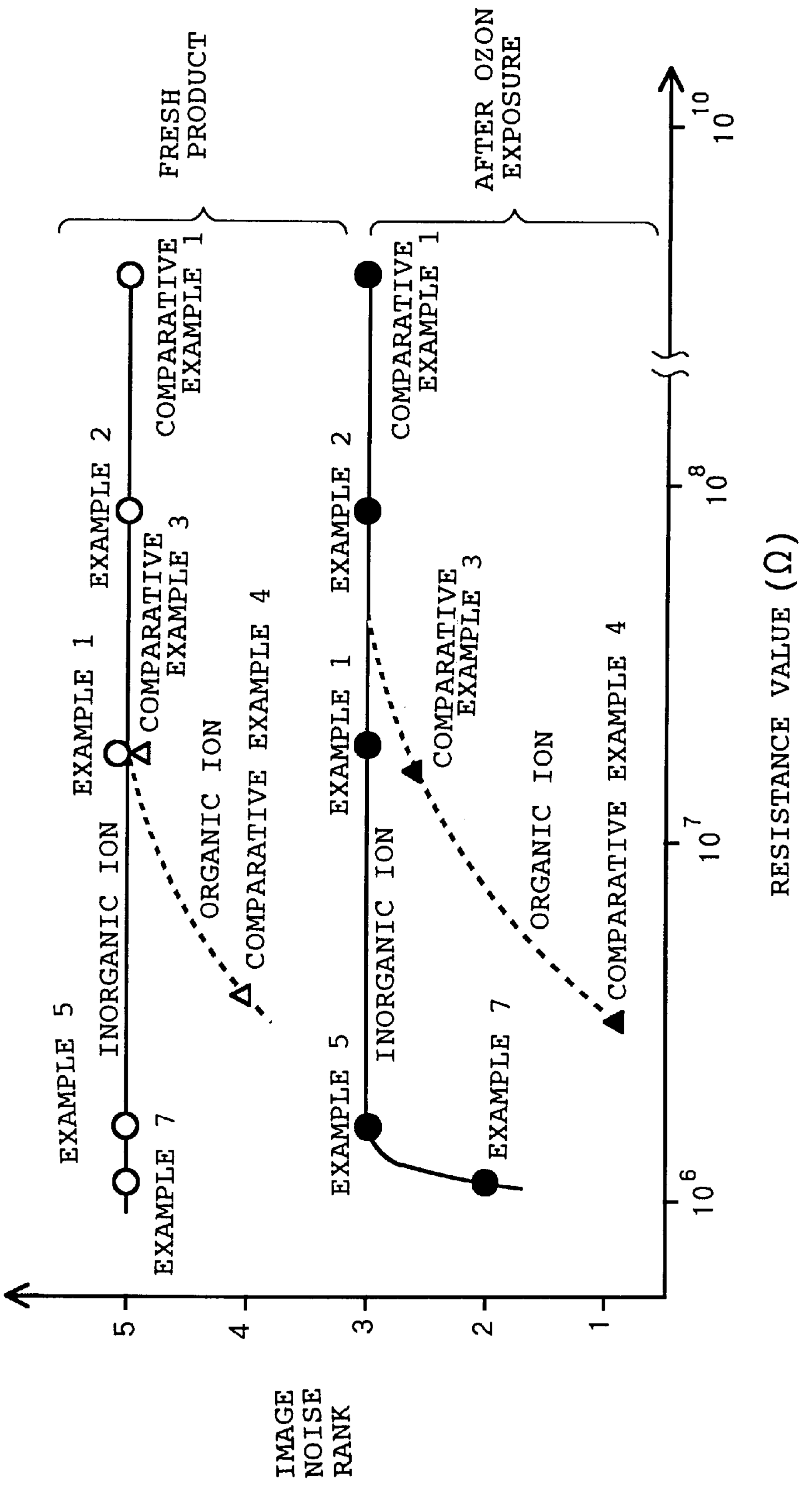
FIG. 5 is a graph showing the relation between the resistance value and image noise rank.

The relation between the resistance value and soiling obtained from the above-mentioned characterization test result described in Examples 1 to 7 and Comparative examples 1 to 4 is shown in FIG. 5. In FIG. 5, the axis of abscissa represents the resistance value measured under NN condition, and the axis of ordinate represents the image noise rank which is the soiling test result on a photosensitive drum. In the figure, standard Example 1, Example 2 which contains less amount of electrically conducting agent, Example 5 which contains additional amount of electrically conducting agent, and Example 7 which contains excessive amount of electrically conducting agent out of Examples 1 to 7, and Comparative example 1 which contains no electrically conducting agent, and Comparative examples 3 and 4 which contain the organic ion electrically conducting agent instead of the inorganic ion electrically conducting agent out of Comparative examples 1 to 4 are plotted.

According to this graph, all the fresh transfer rollers shows excellent result of rank 5 excepting Comparative example 4 which contains an excessive amount of organic ion electrically conducting agent. After ozone exposure, the rank of all the transfer rollers tend to fall, and Example 6 which contains considerably much amount of electrically conducting agent and Comparative example 4 which contains organic ion electrically conducting agent fall to a level lower than that of Examples 1 to 5.

Figure 6:
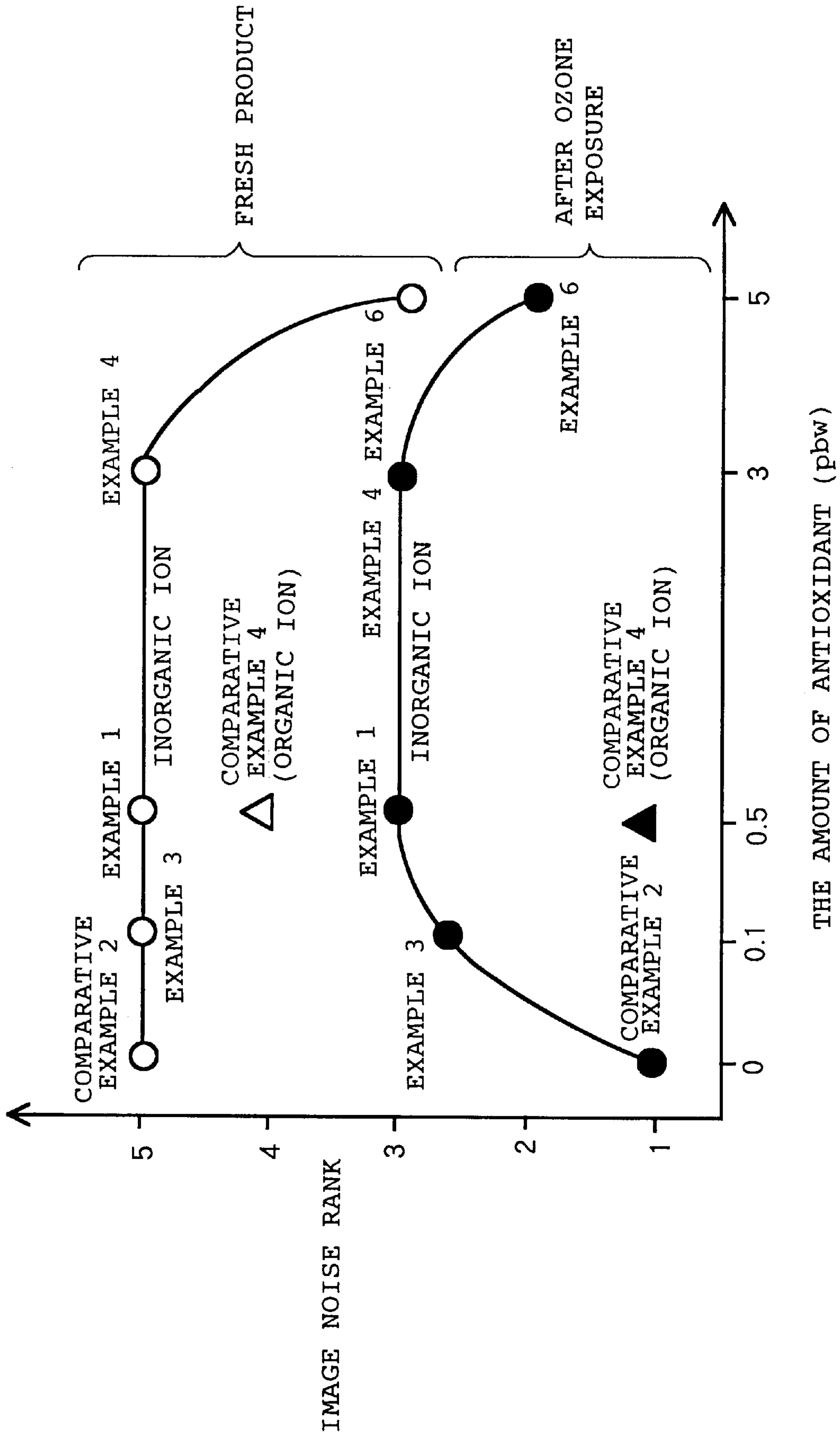
FIG. 6 is a graph showing the relation between the amount of antioxidant and image noise rank.

The relation between antioxidant content and soiling obtained from the above-mentioned characterization test result described in Examples 1 to 7 and Comparative examples 1 to 4 is shown in FIG. 6. In FIG. 6, the axis of abscissa represents antioxidant content (the total amount of IRGANOX1135 and IRGANOX5057), and the axis of ordinate represents the image noise rank. In the figure, standard Example 1, Example 3 which contains less amount of antioxidant, Example 4 which contains additional amount of antioxidant, and Example 6 which contains excessive amount of antioxidant out of Examples 1 to 7, and Comparative example 2 which contains no antioxidant, and Comparative example 4 which contains the organic ion electrically conducting agent instead of the inorganic ion electrically conducting agent out of Comparative examples 1 to 4 are plotted.

According to this graph, all the fresh transfer rollers shows excellent result of rank 5 excepting Comparative example 4 which contains an excessive amount of organic ion electrically conducting agent and Example 6 which contains considerably much amount of antioxidant. After ozone exposure, the rank of all the transfer rollers tend to fall, and Comparative example 2 which contains no antioxidant falls to a level lower than that of each Example.

The present invention is not restricted to aspect of an embodiment and the embodiment itself which are merely shown as an example. Therefore, it is naturally possible to improve and modify the present invention in various ways so long as these are not departed from the gist thereof. In detail, various characterization tests are performed on a transfer roller which employs conductive contact material of the present invention, other than a transfer roller, the same characterization test is applicable to a transfer sheet, a charging brush, a charging roller, a developing roller, a destaticizing sheet, a cleaning blade, and a cleaning roller. In the Examples of the present invention, a photosensitive drum was the subject to be charged by conductive contact material. However, the subject of contact charging is not restricted to a photosensitive drum. An intermediate transfer body and a transfer material may be the subject.

It is obvious from the description of the present invention that the use of suitable amount of antioxidant prevents a charged body from being soiled even when the amount of an electrically conducting agent is increased. The suitable amount of antioxidant helps prevent image quality deterioration which is caused by soiling on a charged body. Particularly, performance of a fresh product at initial use reflects the effect described above. Also because an inorganic ion type conducting agent is employed, the soiling on a charged body is little even after repeated use. The employment of an inorganic ion electrically conducting agent provides a conductive contact material which does not soil a charged body due to the content of the agent at initial use and after repeated use. The use of an conductive contact material according to the present invention avoids such as image noise caused by soil on a charged body without involving a large image forming apparatus and complex manufacturing process.

What is claimed is:

1. A conductive contact material consisting of thermoset urethane material containing an antioxidant and an inorganic ion electrically conducting agent.

2. The conductive contact material according to claim 1, wherein said antioxidant is a radical chain terminator type antioxidant.

3. The conductive contact material according to claim 1, wherein the content of said antioxidant is in a range from 0.1 to 3.0% by weight.

4. The conductive contact material according to claim 2, wherein the content of said antioxidant is in a range from 0.1 to 3.0% by weight.

5. The conductive contact material according to claim 1, wherein the content of said inorganic ion electrically conducting agent is in a range from 0.01 to 2.00% by weight.

6. The conductive contact material according to claim 2, wherein the content of said inorganic ion electrically conducting agent is in a range from 0.01 to 2.00% by weight.

7. The conductive contact material according to claim 3, wherein the content of said inorganic ion electrically conducting agent is in a range from 0.01 to 2.00% by weight.

8. The conductive contact material according to claim 1, wherein said conductive contact material is used for a transfer roller.

9. The conductive contact material according to claim 2, wherein said conductive contact material is used for a transfer roller.

10. The conductive contact material according to claim 3, wherein said conductive contact material is used for a transfer roller.

11. The conductive contact material according to claim 4, wherein said conductive contact material is used for a transfer roller.

12. The conductive contact material according to claim 5, wherein said conductive contact material is used for a transfer roller.

13. The conductive contact material according to claim 6, wherein said conductive contact material is used for a transfer roller.

14. The conductive contact material according to claim 7, wherein said conductive contact material is used for a transfer roller.

* * * * *

UNITED STATES PATENT AND TRADEMARK OFFICE

CERTIFICATE OF CORRECTION

PATENT NO. : 5,968,418

DATED : October 19, 1999

INVENTOR(S) : Matsushita et al.

It is certified that error appears in the above-identified patent and that said Letters Patent is hereby corrected as shown below:

On the title page, item [56] References Cited,

Under Foreign Patent Documents, change "3/1991" to --3/1981-- and "5/1993" to --5/1983--.

Signed and Sealed this

Eleventh Day of April, 2000

Attest:

Q. TODD DICKINSON

*Attesting Officer*

*Director of Patents and Trademarks*